UNITED STATES PATENT OFFICE.

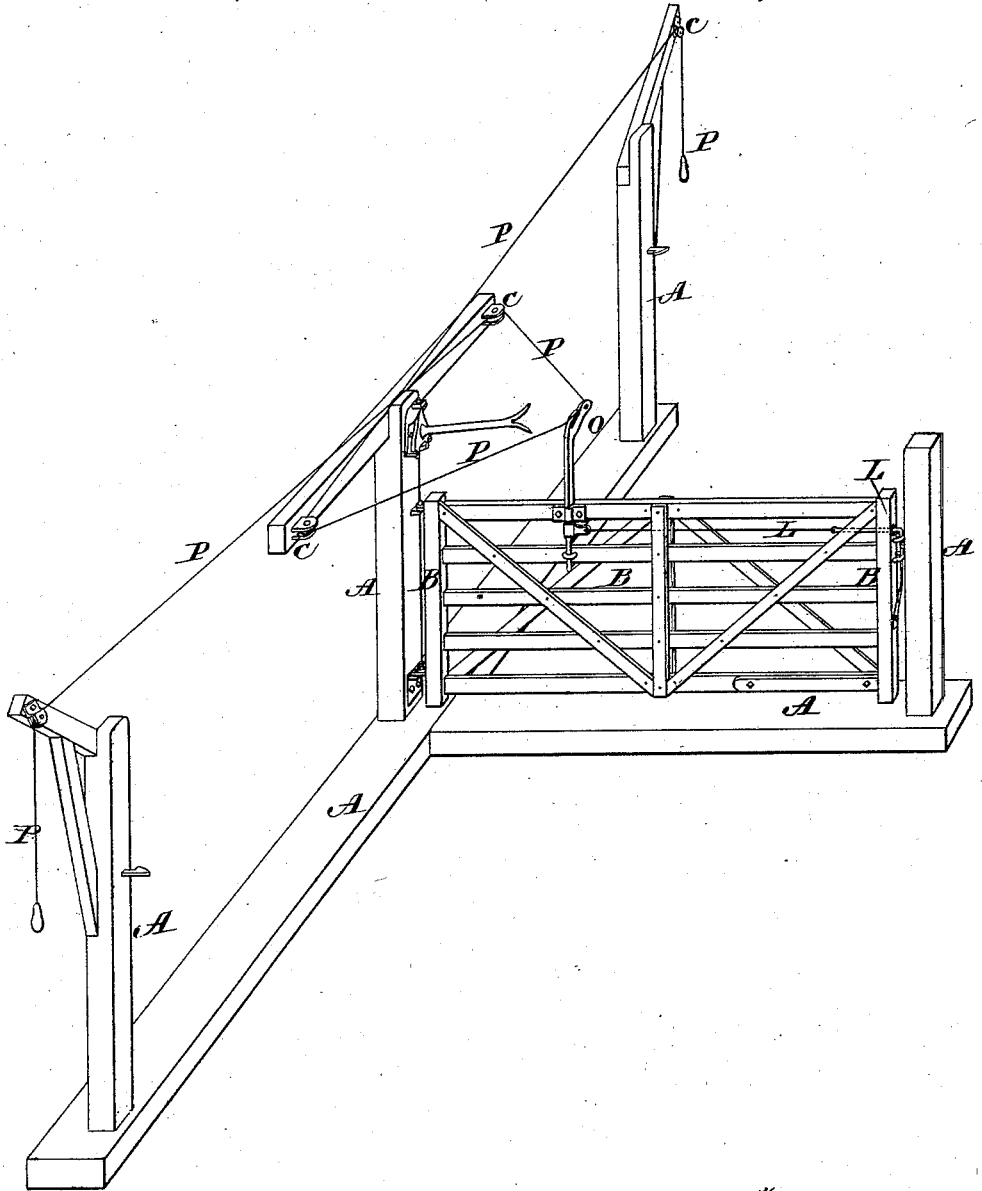

PETER H. RUDE, OF CLINTON, WISCONSIN, ASSIGNOR OF ONE-HALF HIS RIGHT TO OLIVER ANDERSON, OF SAME PLACE.

IMPROVEMENT IN GATES.

Specification forming part of Letters Patent No. 203,295, dated May 7, 1878; application filed February 15, 1878.

*To all whom it may concern:*

Be it known that I, PETER H. RUDE, of Clinton, of Rock county, in the State of Wisconsin, have invented certain new and useful Improvements in Mechanism for Operating Farm or Carriage Gates; and I do hereby declare the following description and accompanying drawings are sufficient to enable any person skilled in the art or science to which it most nearly appertains to make and use my said invention or improvements without further invention or experiment.

The nature of my invention and improvements consists in the construction of the improved mechanism for opening and closing farm or carriage gates, which is clearly shown in the accompanying drawing, and hereinafter fully explained and described, and in which said drawing—

Letter A represents the ground-frame or sills and posts, to one of which the gate is hinged, to which, also, it is latched by automatic mechanism, when open or closed, as shown. B represents the gate. L is an ordinary spring-latch, with operating-cord attached thereto, and the arm of the oscillating lever O, as shown. S is a forked self-balancing oscillating or swinging lever, for the purpose of enabling the pull-cord P to obtain and exert a suitable leverage upon the gate when open, to facilitate closing thereof, by means of actuating the pull-cords P at either approach; and P are pull-cords for operating the mechanism of the gate in opening and closing, all of which is clearly shown in the drawing, and will be clearly understood by those skilled in the art to which it appertains.

The gate is opened from either approach by means of the pull-cord P opening in the direction of travel, which is an important feature, greatly lessening the danger of fright of horses attached to carriages or otherwise, and that, when open or closed, the gate is always automatically latched, as shown.

The pull-cords P traverse pulleys C, the inner ends of each of which are made fast to one prong of the oscillating lever O, so that when either pull is drawn the gate-latch is at once released from the catch, and the gate is at once opened, as described.

The gate is so hinged that it is self-closing by means of its own gravity, when released from the catches holding it open, as shown; and the self-adjusting swing-hinged lever S is so placed that when the gate is swung open the forked end receives the cord P, traveling with it and holding it out, and preventing it from attaining a straight line in the direction of the pulleys C, and thus, as hereinbefore stated, enabling the cord P to exert a leverage upon the gate to enable it to be acted upon by the cords P in a rotary manner, as clearly shown in the drawing, and will be plainly understood by those skilled in the art to which it appertains.

Having thus clearly explained the method of operating a gate by means of mechanism herein described, what I claim as new, and desire to secure by Letters Patent, is—

The self-adjusting lever S, in combination with the oscillating lever O, latch L, pull-cords P, and pulleys C, substantially as and for the purpose specified.

PETER H. RUDE.

Witnesses:
A. H. MORGAN,
O. L. WOODWARD.